(12) United States Patent
Feng et al.

(10) Patent No.: US 9,298,692 B2
(45) Date of Patent: Mar. 29, 2016

(54) REAL TIME DATA TAGGING IN TEXT-BASED DOCUMENTS

(71) Applicant: Lenovo (Singapore) Pte. Ltd., Singapore (SG)

(72) Inventors: Xin Feng, Arcadia, CA (US); Rod D. Waltermann, Rougemont, NC (US); Mei-Wen Sun, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 14/159,070

(22) Filed: Jan. 20, 2014

(65) Prior Publication Data

US 2015/0205780 A1 Jul. 23, 2015

(51) Int. Cl.
*G06F 17/27* (2006.01)
*G06F 17/22* (2006.01)
*G06F 17/24* (2006.01)

(52) U.S. Cl.
CPC ........ *G06F 17/2705* (2013.01); *G06F 17/2235* (2013.01); *G06F 17/241* (2013.01)

(58) Field of Classification Search
CPC .................. G06Q 10/063112; G06Q 30/0239; H04L 51/066; H04L 51/08; H04L 51/18; G06F 17/20; G06F 17/241; G06F 17/3002; G06F 17/30873; G06F 3/0482
USPC ....................... 704/9; 707/736; 705/1; 725/94
See application file for complete search history.

(56) References Cited

U.S. PATENT DOCUMENTS

2013/0276041 A1* 10/2013 Dutta .............................. 725/94

FOREIGN PATENT DOCUMENTS

CN 103123566 A 5/2013

\* cited by examiner

*Primary Examiner* — Charlotte M Baker
(74) *Attorney, Agent, or Firm* — Ference & Associates LLC

(57) ABSTRACT

An aspect provides a method, including: receiving user input to an input component of an information handling device; generating a machine based representation of the user input; analyzing, using a processor, the representation of the user input; forming, using a processor, a tag based on contextual user data related to the user input; and providing, using a processor, an indication of the tag. Other aspects are described and claimed.

20 Claims, 6 Drawing Sheets

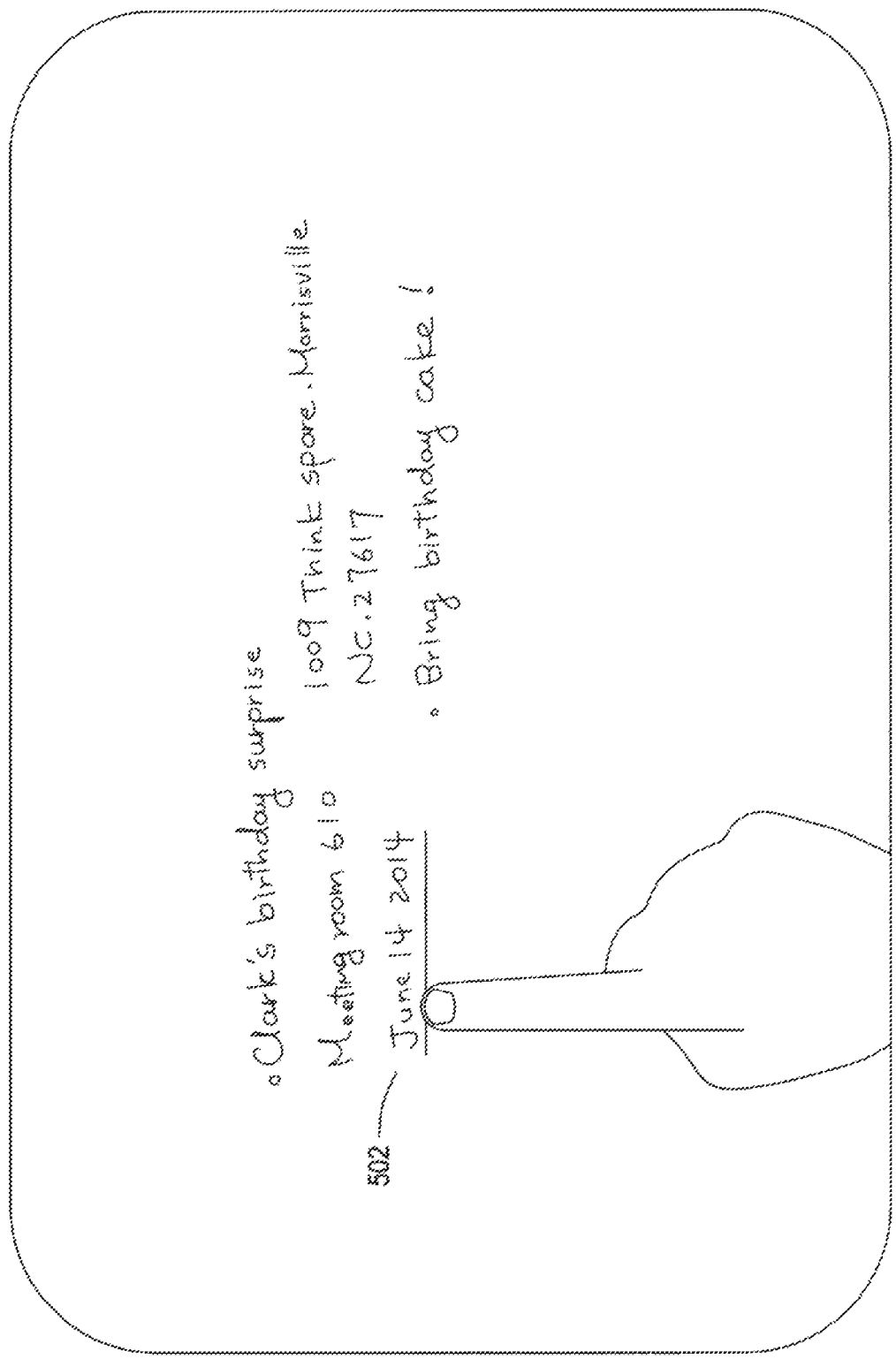

REAL TIME DATA TAGGING IN TEXT-BASED DOCUMENTS

BACKGROUND

Information handling devices ("devices") come in a variety of forms, for example desktop or laptop computing devices, tablet computing devices, smart phones, and the like. While various applications are provided by these devices for users to input and organize their data, such applications tend to be insular in that, although they faithfully record and organize user data, these applications tend to not provide richer context information that a user may find helpful or desirable.

For example, when creating a text-based document, such as writing an email, creating a note or memo, etc., the text itself is isolated and does not provide a user with the opportunity to identify or review contextual data or information related to the input text. As such, there is a usability deficit in that conventional applications do not provide users with personalized, contextual data or information related to the current user inputs, e.g., to a word processing application.

BRIEF SUMMARY

In summary, one aspect provides a method, comprising: receiving user input to an input component of an information handling device; generating a machine based representation of the user input; analyzing, using a processor, the representation of the user input; forming, using a processor, a tag based on contextual user data related to the user input; and providing, using a processor, an indication of the tag.

Another aspect provides an information handling device, comprising: an input component that accepts user input; a display device; a processor operatively coupled to the display device; a memory device that stores instructions accessible to the processor, the instructions being executable by the processor to: receive user input to the input component; generate a machine based representation of the user input; analyze the representation of the user input; form a tag based on contextual user data related to the user input; and provide an indication of the tag.

A further aspect provides a product, comprising: a storage device having code stored therewith, the code being executable by a processor and comprising: code that receives user input to an input component of an information handling device; code that generates a machine based representation of the user input; code that analyzes, using a processor, the representation of the user input; code that forms, using a processor, a tag based on contextual user data related to the user input; and code that provides, using a processor, an indication of the tag.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
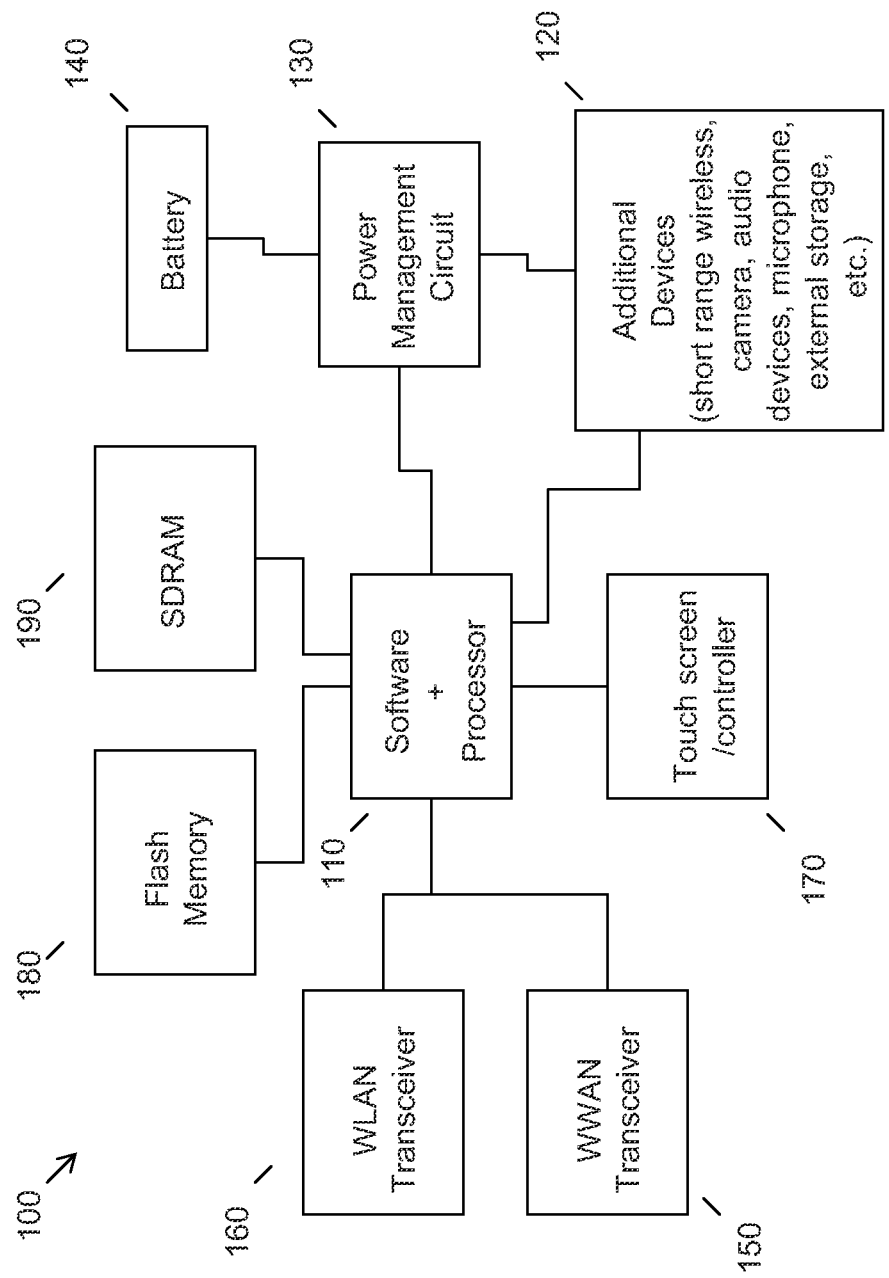
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When creating a text-based document (e.g., writing an email, a note, a memo, etc.), there is a usability benefit in providing users with contextual information in real-time. Such contextual information, inherently personalized to the user himself/herself by virtue of its relevance to the user inputs, may include but is not limited to user's contact data, calendar data, usage history data, local resources/data (e.g., movies, music, videos, etc.). The contextual data referred to herein is user contextual data, e.g., data derived from the user such as device contacts, cloud account contacts, user created documents such as emails, SMS text messages, word processing documents, picture and video files, etc. Such contextual information will assist users in providing input, performing additional functions, and gives users a context related to their text-based inputs in real-time.

An embodiment operates in an environment in which a user is creating text-based documents on a device (e.g., laptop, tablet, phone, etc.). The text input may be provided using various types of input components (e.g., keyboard, on-screen/soft keyboard, handwriting, stylus, etc.). The documents include but are not limited to word processing document, notes, emails, calendar entries, text messages, instant messages, memos and the like.

An embodiment therefore provides a method of receiving user input to an input component of a device which is thereafter rendered in a display device. The user input is thus provided in the context of an application running on the device. An embodiment analyzes the user input and forms a tag based on contextual data related to the user input. Having identified some relevant contextual information, e.g., a device contact named in the text input of the user, an embodiment provides an indication of the tag in the application running on the device, e.g., a color-coding of the text input. A user may interact or interface with the tag, such as touching a color-coded text input, and an embodiment may provide contextual information that has been identified, e.g., contact information for the contact included in the text input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
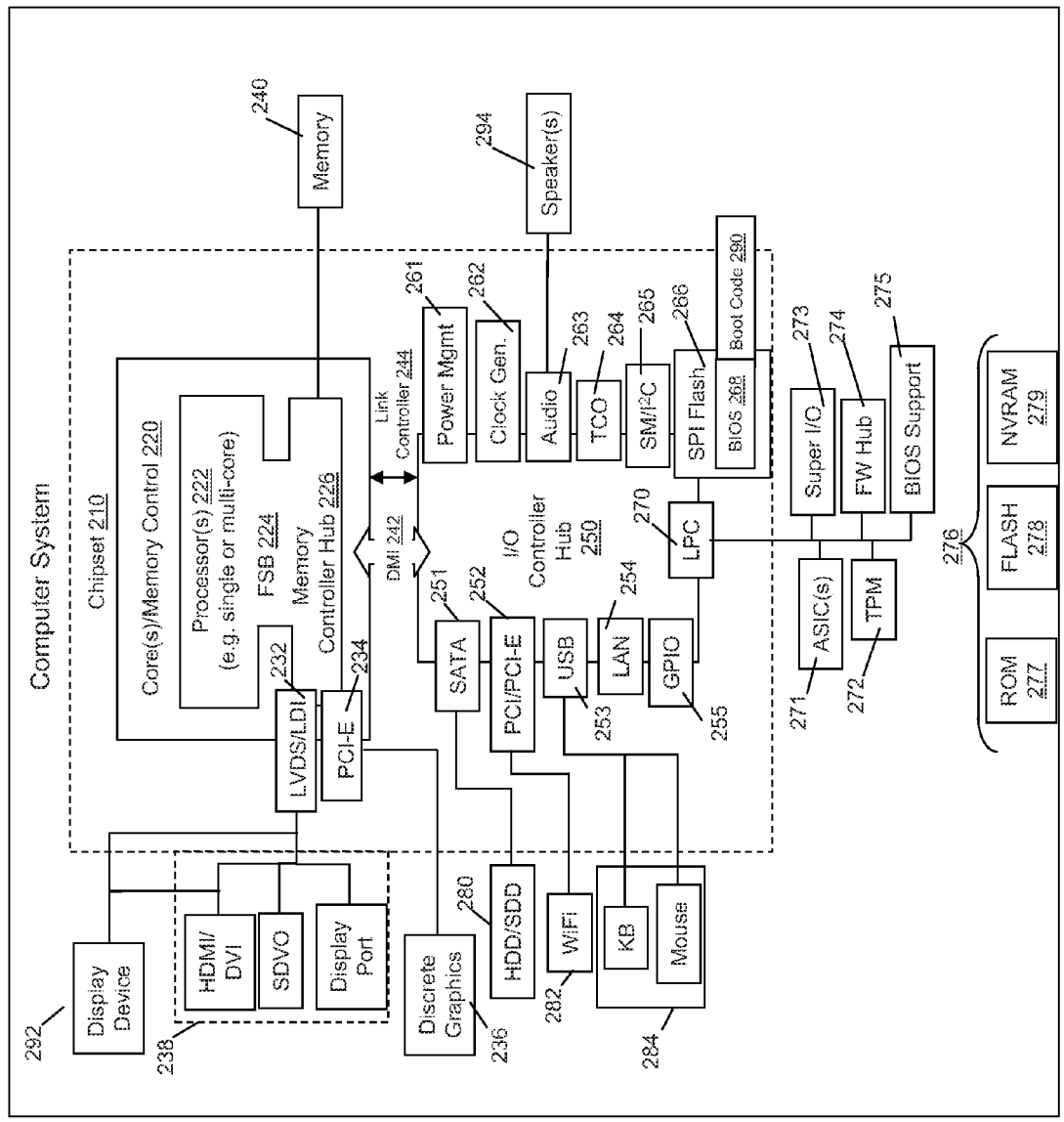
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as laptop computers, desktop computer, tablet computers, smart phones, etc. that analyze user text-based input to provide contextual data or information. When a user is inputting text, e.g., writing a text document in a word processing application, an embodiment employs an intelligent-engine, which may run as a system-wide background task and/or an application-specific extension, to perform text analysis in real-time, e.g., as the user inputs text to the application.

Figure 3:
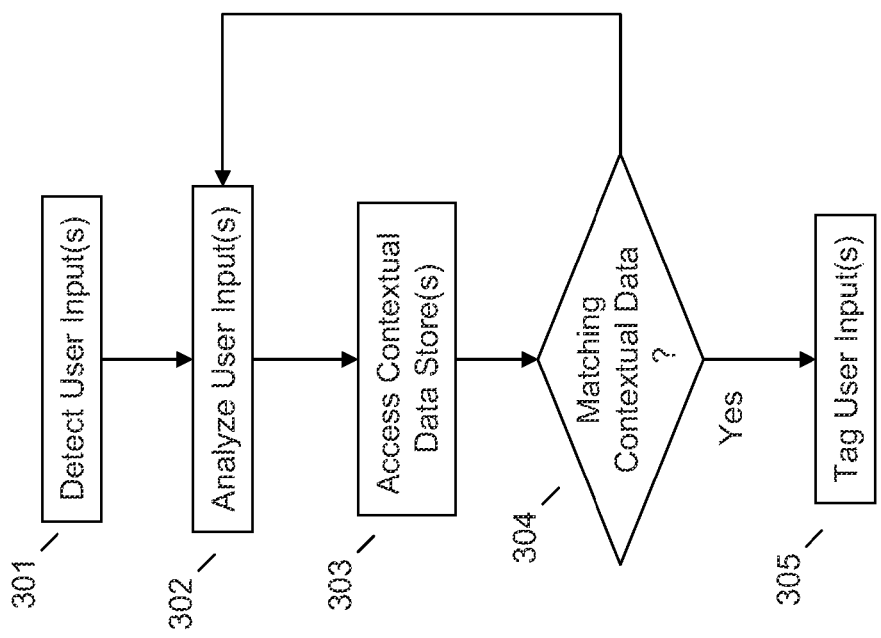
FIG. 3 illustrates an example of real-time contextual tagging of user inputs.

An embodiment, referring to FIG. 3, thus accepts user input text at 301 and analyzes the text at 302 to determine its characteristics, e.g., one or more key words of text, and thereby determine if there is relevant contextual data available with respect to the user input. Thus, an embodiment may access sources of contextual information at 303 in order to determine at 304 if relevant contextual data exists. Some non-limiting examples of contextual data sources include by are not limited to local device or cloud-based contacts (e.g., address book entries, instant messaging contacts list, etc.), local device or cloud-based calendar entries, local device or cloud-based resources (e.g., user-specific data such as video files, photos, music files, etc.), prior documents and/or prior user inputs (e.g., previous text inputs, previously created documents), and prior history information (e.g., stored web browsing information such as online shopping data, favorite web pages, etc.).

If an embodiment determines that there exists relevant contextual information, e.g., via conducting a matching process between the user's real-time input and contextual information included in an available data source at 304, an embodiment tags the user's real-time input(s) in the application at 305. Otherwise, the user input may remain unaltered (i.e., no tag(s) added). In either case (i.e., whether user input has been tagged on not), an embodiment may continue to analyze the user inputs, e.g., on an ongoing basis, in an effort to identify contextual information and form tags. Moreover, previously prepared tags may be modified, e.g., based on further user inputs. The tags may be stored along with the user inputs by the application, i.e., such that a previous document may be retrieved from storage along with its tag information. Alternatively, tags may be formed anew each time a document is opened, or a suitable combination of the foregoing.

Depending on type of contextual information available, contextual tagging may exhibit different behavior. For example, if contextual data is derived from a local computer or cloud-based contact data store, an embodiment may tag the corresponding text input (e.g., via color coding or like indication) and allow display of the contact's information (e.g., name, telephone, email, address, etc.) if the user interfaces (e.g., clicks on or touches) the color coded/tagged text input.

As another example, if the contextual data is derived from a local device or cloud-based calendar entry, an embodiment may tag the corresponding text input in the application and allow the user to interact therewith to display all calendar entry information (e.g., date, time, event, etc.). If the contextual data is derived from a local device or cloud-based resource (e.g., video, photo, music, files, etc.), an embodiment may display resource information (e.g., link thereto, file name, etc.) and allow direct access to media, e.g., via interacting with the link.

If the contextual data is derived from a prior document input (e.g., previously created word processing file, previously drafted email, etc.), an embodiment may tag the input and allow direct access to prior document. If the contextual data is derived from a prior history (e.g., web browsing data, online shopping data, etc.) an embodiment may tag and allow to access to the prior history information and/or related contextual information (e.g., previously visited web page, etc.).

Figure 4:
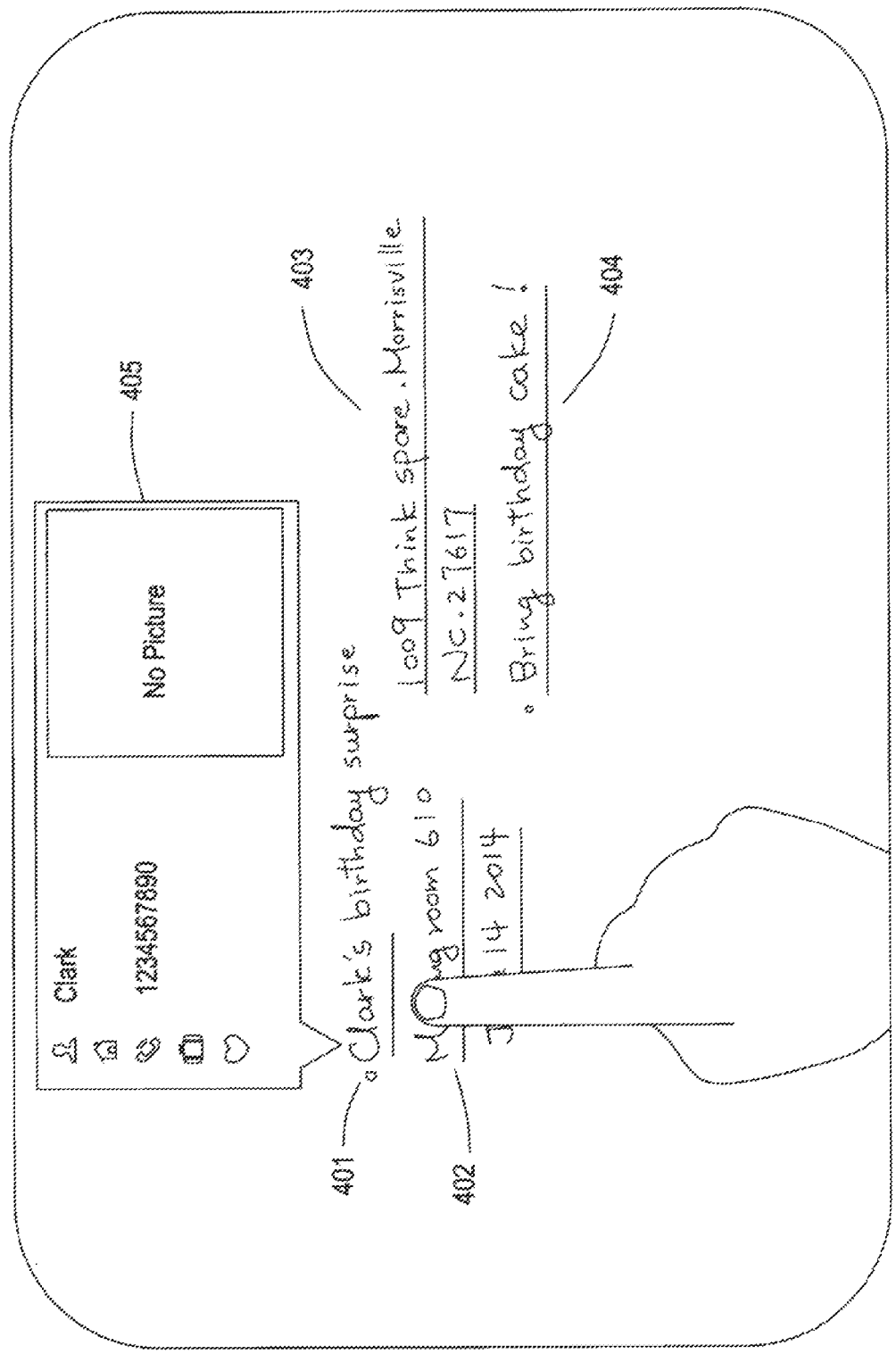
FIG. 4 illustrates an example of contextual tags for user inputs.

FIG. 4 and FIG. 5(A-B) illustrate examples of real-time tagging and provisioning of contextual information. In FIG. 4, an embodiment tags user inputs 401-404 with different indications, e.g., color coding or with underlining (underlining is used for illustration given the black and white line drawings used herein). This corresponds to an embodiment recognizing a user has input text-based input, in this example handwriting input to a word processing application, and analyzing the text to identify matching contextual data, as outlined in FIG. 3. In FIG. 4 it is illustrated that if the user interfaces with a tagged input, e.g., "Clark", an embodiment provides contextual data 405, in this example in the form of displaying contact information for the contact "Clark".

Figure 5B:
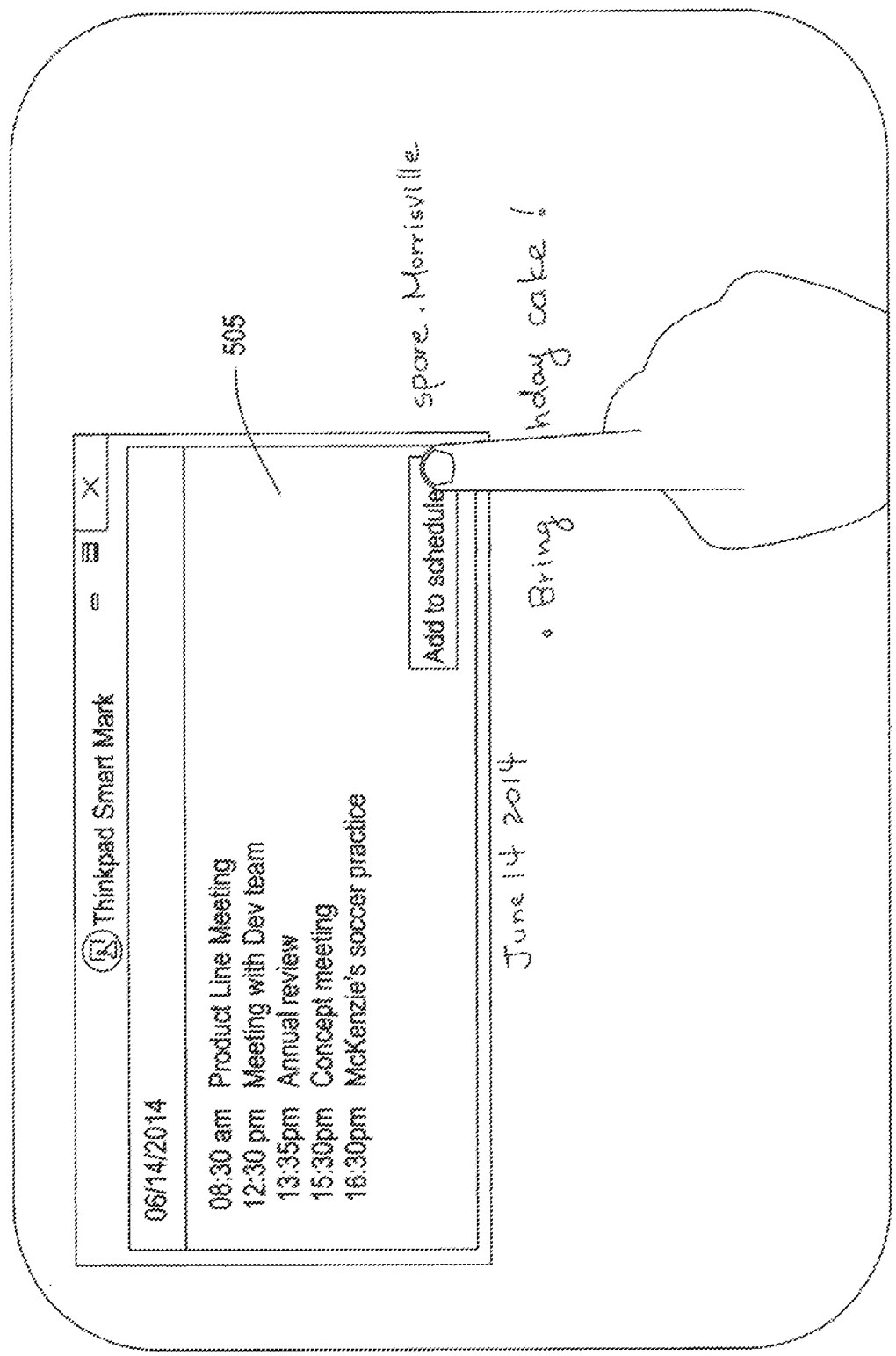
FIG. 5(A-B) illustrates another example of contextual tags for user inputs.

FIG. 5A likewise illustrates that if the user interfaces, e.g., touches or clicks on, with another tagged input 502, in this example the date Jun. 14, 2014, an embodiment provides, referring to FIG. 5B, a display of contextual information 505 matching this date as derived from a relevant source, in this example the calendar entries for that date derived from a calendar application of the device. As illustrated in FIG. 5B, and described herein, an embodiment may provide for added functionality with respect to the contextual information provided. In this example, the contextual information 505 includes an option to add the underlying text-based input, herein Jul. 14, 2014 and "Clark's Birthday" to the calendar application or scheduling application. Other data may be added to the calendar entry as well, either automatically and/or via accepting further user input.

Likewise, depending on the context, additional or different functionalities may be provided. Referring back to FIG. 4, for example, in the context where the contextual data provides a contact's information, an option may be provided to call, text, email or otherwise communicate with the contact in real-time, e.g., depending on the particular device's communication capabilities, the capabilities of the device's various applications, etc.

Therefore, an embodiment allows for analysis of user inputs and identifying relevant contextual information. Using the contextual information identified or determined, an embodiment may tag the user input such that a user may review or access the contextual data and/or perform additional functions based thereon.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions.

These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving user input to an input component of an information handling device;
   generating a machine based representation of the user input;
   analyzing, using a processor, the representation of the user input;
   forming, using a processor, a tag based on contextual user data related to the user input; and
   providing, using a processor, an indication of the tag.

2. The method of claim 1, wherein said analyzing comprises identifying one or more key words associated with the representation of the user input.

3. The method of claim 2, wherein said analyzing comprises searching one or more sources for contextual data related to the one or more key words.

4. The method of claim 3, wherein the one or more sources is selected from the group consisting of an off-device source operatively coupled to the information handling device and an on-device source.

5. The method of claim 1, wherein providing an indication of the tag comprises providing a visual indication of the tag in a display device.

6. The method of claim 1, further comprising:
   determining user interaction with the indication of the tag; and
   providing output containing contextual data of the tag to the user.

7. The method of claim 5, further comprising:
   determining user interaction with the indication of the tag; and
   providing output containing contextual data of the tag to the user;
   wherein providing output containing contextual data of the tag to the user comprises rendering, in the display device, the contextual data of the tag.

8. The method of claim 7, wherein:
   rendering comprises providing a link to additional contextual data; and
   the link provides access to the additional contextual data.

9. The method of claim 1, wherein the contextual user data comprises user contact data related to the contextual data of the tag.

10. The method of claim 1, wherein the user input is selected from the group of user inputs consisting of physical keyboard input, soft key input, audio input, and handwriting input.

11. An information handling device, comprising:
    an input component that accepts user input;
    a display device;
    a processor operatively coupled to the display device;
    a memory device that stores instructions accessible to the processor, the instructions being executable by the processor to:
    receive user input to the input component;
    generate a machine based representation of the user input;
    analyze the representation of the user input;
    form a tag based on contextual user data related to the user input; and
    provide an indication of the tag.

12. The information handling device of claim 11, wherein to analyze comprises identifying one or more key words associated with the representation of the user input.

13. The information handling device of claim 12, wherein to analyze comprises searching one or more sources for contextual data related to the one or more key words.

14. The information handling device of claim 13, wherein the one or more sources is selected from the group consisting of an off-device source operatively coupled to the information handling device and an on-device source.

15. The information handling device of claim 11, wherein to provide an indication of the tag comprises providing a visual indication of the tag in a display device.

16. The information handling device of claim 11, wherein the instructions are further executable by the processor to:
    determine user interaction with the indication of the tag; and
    provide output containing contextual data of the tag to the user.

17. The information handling device of claim 15, wherein the instructions are further executable by the processor to:
    determine user interaction with the indication of the tag; and
    provide output containing contextual data of the tag to the user;
    wherein providing output containing contextual data of the tag to the user comprises rendering, in the display device, the contextual data of the tag.

18. The information handling device of claim 17, wherein:
    rendering comprises providing a link to additional contextual data; and
    the link provides access to the additional contextual data.

19. The information handling device of claim 11, wherein the contextual user data comprises user contact data related to the contextual data of the tag.

20. A product, comprising:
    a storage device having code stored therewith, the code being executable by a processor and comprising:
    code that receives user input to an input component of an information handling device;

code that generates a machine based representation of the user input;
code that analyzes, using a processor, the representation of the user input;
code that forms, using a processor, a tag based on contextual user data related to the user input; and
code that provides, using a processor, an indication of the tag.

* * * * *